United States Patent [19]
Ridley et al.

[11] Patent Number: 5,655,838
[45] Date of Patent: Aug. 12, 1997

[54] RADIATION THERMOMETER WITH A FOCUSING SYSTEM

[75] Inventors: Ian Hamilton Ridley, Sheffield, England; Peter Fearnehough, Sheffield, United Kingdom

[73] Assignee: Land Instruments International Limited, Sheffield, Great Britain

[21] Appl. No.: 460,654

[22] Filed: Jun. 2, 1995

[30] Foreign Application Priority Data

Jun. 3, 1994 [GB] United Kingdom ............ 9411160

[51] Int. Cl.⁶ .................. G01J 5/08; G01K 1/14
[52] U.S. Cl. ............ 374/130; 374/141; 359/694; 250/201.2; 396/144; 396/148; 396/373
[58] Field of Search ............ 374/130, 121, 374/141; 359/694, 823, 825; 250/201.2, 358.1; 396/144, 148, 373, 382

[56] References Cited

U.S. PATENT DOCUMENTS

| | | | |
|---|---|---|---|
| 2,798,962 | 7/1957 | Wormser | 374/130 |
| 3,091,694 | 5/1963 | Goodridge | 374/130 |
| 3,187,574 | 6/1965 | Mason et al. | 374/130 |
| 3,264,931 | 8/1966 | Ackerman et al. | 374/130 |
| 3,269,255 | 8/1966 | Shaw | 374/130 |
| 3,405,269 | 10/1968 | Wood | 374/124 |
| 4,353,634 | 10/1982 | Himmelsbach | 359/694 |
| 4,576,432 | 3/1986 | Ruger | 374/124 |
| 4,664,515 | 5/1987 | Imura et al. | 374/130 |
| 5,062,697 | 11/1991 | Mitchell | 359/823 |
| 5,150,260 | 9/1992 | Chigira | 359/694 |
| 5,239,417 | 8/1993 | Eguchi et al. | 359/823 |
| 5,377,048 | 12/1994 | Tada et al. | 359/694 |
| 5,388,907 | 2/1995 | Aoyama et al. | 374/130 |

FOREIGN PATENT DOCUMENTS

| | | | |
|---|---|---|---|
| 166390 | 6/1916 | Germany. | |
| 2844655 | 4/1980 | Germany | 359/694 |
| 63-236932 | 10/1988 | Japan | 374/130 |
| 0092708 | 4/1989 | Japan | 359/694 |
| 404317015 | 11/1992 | Japan | 359/694 |
| 2226422 | 6/1990 | United Kingdom | 359/825 |

*Primary Examiner*—Diego F. F. Gutierrez
*Attorney, Agent, or Firm*—Sterne, Kessler, Goldstein & Fox, P.L.L.C.

[57] ABSTRACT

A radiation thermometer assembly comprises a housing to a front end of which is movably mounted an objective lens housing. An eye piece is mounted to the radiation thermometer housing and is arranged to receive light passing through the objective lens. A control system causes relative movement between the objective lens housing and the radiation thermometer housing, the control system being connected to a manual control member for operating the control system. The control member is mounted to the radiation thermometer housing at a position spaced from the objective lens housing.

8 Claims, 1 Drawing Sheet

RADIATION THERMOMETER WITH A FOCUSING SYSTEM

FIELD OF THE INVENTION

The invention relates to radiation thermometers, for example infrared thermometers.

DESCRIPTION OF THE PRIOR ART

An important aspect of a radiation thermometer is to ensure that it is correctly focused. Normally this is done by causing relative sliding movement between an objective lens housing and the remainder of the radiation thermometer housing. However, this can be difficult to achieve when the radiation thermometer is in situ.

SUMMARY OF THE INVENTION

In accordance with the present invention, a radiation thermometer comprises a housing to a front end of which is movably mounted an objective lens housing; an eye piece mounted to the radiation thermometer housing and arranged to receive light passing through the objective lens; and control means for causing relative movement between the objective lens housing and the radiation thermometer housing, the control means being connected to a manual control member for operating the control means, the control member being mounted to the radiation thermometer housing at a position spaced from the objective lens housing.

This invention enables the focusing operation to be achieved remotely of the objective lens housing which is particularly useful when the thermometer is being used in hostile environments.

Conveniently, the control member is positioned at the rear of the radiation thermometer housing and also conveniently the eye piece is mounted at the rear of the radiation thermometer housing. This is not essential, however, and for example using suitable optical components, the eye piece could be mounted to the side of the housing and with suitable mechanical components the control member could be mounted at the side. Alternatively, one or both could be mounted at the rear.

Conveniently, however, the control member comprises a tube which is rotatably mounted about the eye piece. This leads to a very neat and compact structure which is easy to operate.

In a simple case, the control means could comprise a sliding arrangement, the control member simply being pushed in and out of the housing to adjust the position of the objective lens housing. In this case the control member could be integral with the control means. Preferably, however, the control means includes a pair of members connected together by a screw threaded spigot/socket connection, whereby rotation of one of the members connected to the control member causes linear movement of the other member which is connected to the objective lens housing.

The invention is particularly suited for use with infrared thermometers but could also be used with other types of radiation thermometer of known construction.

BRIEF DESCRIPTION OF THE DRAWINGS

An example of an infrared thermometer assembly according to the invention will now be described with reference to the accompanying drawings, in which.

DETAILED DESCRIPTION OF THE EMBODIMENT

Figure 1:
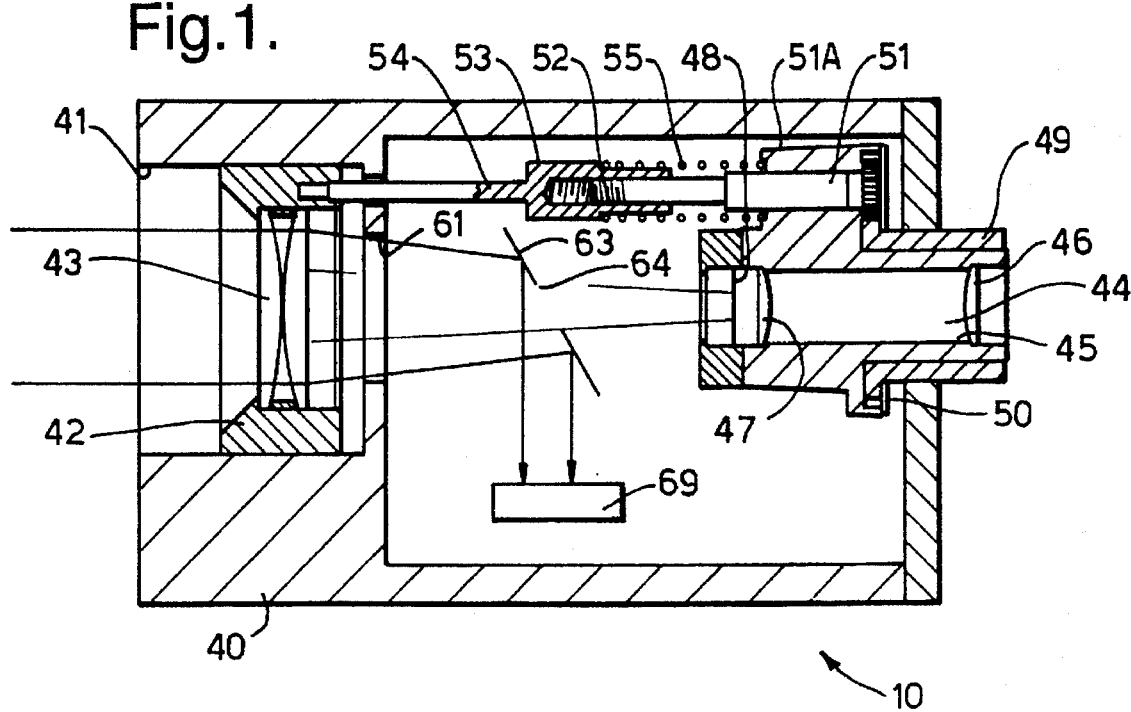
FIG. 1 is a longitudinal section through the assembly.

FIG. 1 illustrates an infrared thermometer assembly 10 having a housing 40 which at its front end has a bore 41 in which is slidably mounted a housing 42 supporting an objective lens assembly 43. The rear end of the housing 40 supports an eye piece assembly 44 having a central bore 45 at opposite ends of which are mounted a pair of lenses 46,47 with a graticule 48 upstream of the lens 47. As seen in FIG. 1, infrared radiation entering the objective lens assembly 43 passes to a beam splitter 63 to be described with reference to FIG. 2. The beam splitter 63 has a central aperture 64 through which some of the light passes to the graticule 48 and from there to the eye piece assembly 44. Radiation surrounding the central portion is reflected by the beam splitter 63 onto an infrared detector 69.

In order to move the objective lens housing 42 relative to the housing 40, a control mechanism is provided which includes a focusing knob 49 rotatably mounted about the eye piece assembly 44 and constituting a control member, the focusing knob having a gear 50 which intermeshes with a pinion 51 rotatably mounted in a side extension 51A of the eye piece assembly. The pinion 51 terminates in a screw threaded spigot 52 which is received in a correspondingly screw threaded socket 53 of a push rod 54 secured at its other end to the objective lens housing 42.

As the knob 49 is rotated, this will rotate the pinion 51 which in turn rotates within the spigot 53 causing linear movement of the push rod and consequently linear, sliding movement of the objective lens housing 42. A compression spring 55 acts between the eye piece assembly and the push rod 54 to remove any free movement.

Figure 2:
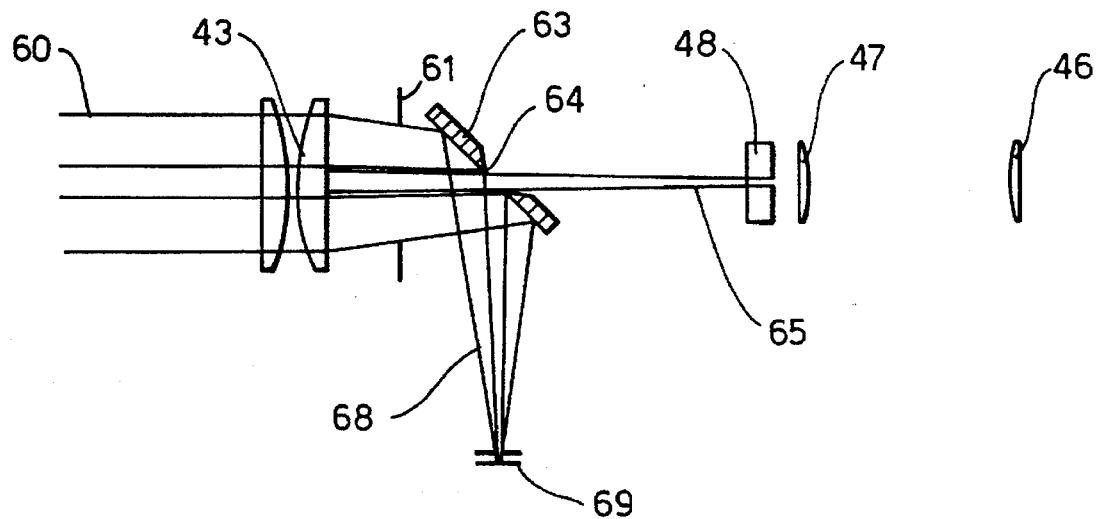
FIG. 2 illustrates the optical arrangement in more detail.

FIG. 2 illustrates the optical arrangement in more detail.

Infrared radiation 60 is received by the objective lens assembly 43 and focused onto the graticule 48. The beam splitter 63 is positioned downstream of a field stop 61 defined by part of the housing 40. The beam splitter 63 has a central aperture 64 through which a central portion 65 of the beam passes undeflected to the graticule 48 and to the field lens 47 and the eye piece lens 46. Radiation in the region surrounding the central region 65 is reflected by the beam splitter 63 as shown at 68 on to the infrared detector 69.

In use, the operator looks through the eye piece assembly 44 and focuses the radiation by rotating the knob 49. Once this has been achieved he then observes the image indicating the target from which infrared radiation will be received and if necessary adjusts the orientation of the housing 40 so that the thermometer is aimed at the correct part of the target. Thereafter, the operator will know that the infrared radiation received by the detector 69 has been received from the desired target.

We claim:

1. A radiation thermometer comprising a housing defining a front end; an objective lens housing movably mounted to said front end; an eye piece mounted to said radiation thermometer housing and arranged to receive light passing through said objective lens; and control means for causing relative movement between said objective lens housing and said radiation thermometer housing, said control means being connected to a manual control member for operating said control means, the control member being mounted to said radiation thermometer housing at a position spaced from said objective lens housing and around said eye piece.

2. A thermometer according to claim 1, wherein said control member is positioned at the rear of said radiation thermometer housing.

3. A thermometer according to claim 1, wherein said eye piece is mounted at the rear of said radiation thermometer housing.

4. A thermometer according to claim 1, wherein said control member comprises a tube which is rotatably mounted about said eye piece.

5. A radiation thermometer comprising:

a housing defining a front end;

an objective lens housing movably mounted to said front end;

an eye piece mounted to said radiation thermometer housing and arranged to receive light passing through said objective lens; and control means for causing relative movement between said objective lens housing and said radiation thermometer housing, said control means being connected to a manual control member for operating said control means, said control member being mounted to said radiation thermometer housing at a position spaced from said objective lens housing, said control means includes a pair of members connected together by a screw threaded spigot/socket connection, wherein rotation of one of said members connected to said control member causes linear movement of said other member which is connected to said objective housing.

6. A thermometer according to claim 5, wherein said control member is positioned at the rear of said radiation thermometer housing.

7. A thermometer according to claim 5, wherein said eye piece is mounted at the rear of said radiation thermometer housing.

8. A thermometer according to claim 5, wherein said control member comprises a tube which is rotatably mounted about said eye piece.

* * * * *